(12) United States Patent
Burnier et al.

(10) Patent No.: US 12,465,736 B2
(45) Date of Patent: Nov. 11, 2025

(54) DEVICE COMPRISING MICRONEEDLES FOR IN-SITU REACTION OF A SKIN

(71) Applicant: L'OREAL, Paris (FR)

(72) Inventors: Veronique Burnier, Chevilly-la-Rue (FR); Dominique Bordeaux, Chevilly-la-Rue (FR)

(73) Assignee: L'OREAL, Paris (FR)

( * ) Notice: Subject to any disclaimer, the term of this patent is extended or adjusted under 35 U.S.C. 154(b) by 980 days.

(21) Appl. No.: 17/269,120

(22) PCT Filed: Sep. 24, 2018

(86) PCT No.: PCT/EP2018/075796
§ 371 (c)(1),
(2) Date: Feb. 17, 2021

(87) PCT Pub. No.: WO2020/064083
PCT Pub. Date: Apr. 2, 2020

(65) Prior Publication Data
US 2021/0322744 A1   Oct. 21, 2021

(51) Int. Cl.
*A61M 37/00*   (2006.01)

(52) U.S. Cl.
CPC . *A61M 37/0015* (2013.01); *A61M 2037/0023* (2013.01); *A61M 2037/003* (2013.01); *A61M 2037/0046* (2013.01); *A61M 2037/0061* (2013.01)

(58) Field of Classification Search
CPC ........ A61M 1/77; A61M 1/772; A61M 1/774; A61M 1/777; A61M 37/0015; A61M 2037/0023; A61M 2037/003; A61M 2037/0046; A61M 2037/0061
See application file for complete search history.

(56) References Cited

U.S. PATENT DOCUMENTS

| | | | |
|---|---|---|---|
| 5,879,326 A | 3/1999 | Godshall et al. | |
| 6,503,231 B1 | 1/2003 | Prausnitz et al. | |
| 6,565,532 B1 | 5/2003 | Yuzhakov et al. | |
| 9,302,903 B2 | 4/2016 | Park et al. | |
| 2002/0082543 A1 | 6/2002 | Park et al. | |
| 2004/0223985 A1* | 11/2004 | Dunfield | A45D 34/04 604/890.1 |
| 2009/0088686 A1 | 4/2009 | Cook | |
| 2009/0110731 A1 | 4/2009 | Fritz et al. | |
| 2009/0182306 A1 | 7/2009 | Lee et al. | |

(Continued)

FOREIGN PATENT DOCUMENTS

| | | |
|---|---|---|
| EP | 542669 A1 | 5/1993 |
| EP | 787730 A1 | 8/1997 |

(Continued)

OTHER PUBLICATIONS

Restriction Requirement issued for U.S. Appl. No. 17/269,131, mailed Jan. 12, 2024 (8 pages).

(Continued)

*Primary Examiner* — Dung T Ulsh
(74) *Attorney, Agent, or Firm* — Jason A. Smith; Shumaker, Loop & Kendrick, LLP

(57) ABSTRACT

A device including a base carrying a plurality of microneedles, and including at least one composition aimed at generating an in-situ reaction into the skin, scalp, or lips.

24 Claims, 1 Drawing Sheet

(56) References Cited

U.S. PATENT DOCUMENTS

| | | | |
|---|---|---|---|
| 2010/0049178 A1 | 2/2010 | Deem et al. | |
| 2010/0228203 A1 | 9/2010 | Quan et al. | |
| 2011/0213335 A1 | 9/2011 | Burton et al. | |
| 2011/0230736 A1 | 9/2011 | Tepper et al. | |
| 2012/0116305 A1* | 5/2012 | Papp | A61M 37/0015 604/103.01 |
| 2013/0116523 A1 | 5/2013 | Jung et al. | |
| 2014/0200508 A1* | 7/2014 | Cohen | A61L 31/148 604/46 |
| 2014/0200509 A1 | 7/2014 | Cohen et al. | |
| 2015/0141910 A1* | 5/2015 | Francis | A61M 37/0015 264/255 |
| 2016/0000898 A1* | 1/2016 | Machida | A61P 31/14 424/218.1 |
| 2017/0050010 A1 | 2/2017 | Mcallister et al. | |
| 2018/0289856 A1* | 10/2018 | Huang | C08L 5/00 |
| 2021/0060321 A1 | 3/2021 | Amir | |

FOREIGN PATENT DOCUMENTS

| | | |
|---|---|---|
| EP | 787731 A2 | 8/1997 |
| EP | 2876602 A1 | 5/2015 |
| EP | 3144030 A1 | 3/2017 |
| JP | 2015205094 A | 11/2015 |
| WO | 199608537 A1 | 3/1996 |
| WO | 2005123172 A1 | 12/2005 |
| WO | 2008072229 A2 | 6/2008 |
| WO | 2009040548 A1 | 4/2009 |
| WO | 2014027055 A2 | 2/2014 |
| WO | 2014041531 A1 | 3/2014 |
| WO | 2016076442 A1 | 5/2016 |
| WO | 2017019526 A2 | 2/2017 |

OTHER PUBLICATIONS (Abstract) Niclas Roxhed et al., "Membrane-sealed hollow microneedles and related administration schemes for transdermal drug delivery", Biomed Microdevices, vol. 10 (2): 271-279, Apr. 2008.

https://web.archive.org/web/20160319074846/http:/www.3m.com/3M/en_US/drug-delivery-systems-us/technologies/microneedle (2015); accessed Sep. 2, 2021.

Daugimont et al., "Hollow Microneedle Arrays for Intradermal Drug Delivery and DNA Electroporation", J. Membrane Biol., vol. 236 (1): 117-125, Jul. 2010.

Ita, "Transdermal Delivery of Drugs with Microneedles—Potential and Challenges", Pharmaceutics, vol. 7 (3): 90-105, Jun. 2015.

Larsen et al., "Rheological characterization of an injectable alginate gel system", BMC Biotechnology vol. 15 (29):1-12, May 2015.

Mcallister et al., "Microfabricated needles for transdermal delivery of macromolecules and nanoparticles: Fabrication methods and transport studies", PNAS, vol. 100 (24): 13755-13760, Nov. 2003.

Mukerjee et al., "Microneedle array for transdermal biological fluid extraction and in situ analysis", Sensors and Actuators A, vol. 114 (2-3): 267-275, Sep. 2004.

O'Mahony, "Structural characterization and in-vivo reliability evaluation of silicon microneedles", vol. 16 (3): 333-343, Feb. 2014.

Park et al., "Biodegradable polymer microneedles: Fabrication, mechanics and transdermal drug delivery", Journal of Controlled Release, vol. 104 (1): 51-66, May 2005.

Perennes et al., "Sharp beveled tip hollow microneedle arrays fabricated by LIGA and 3D soft lithography with polyvinyl alcohol", Journal of Micromechanics and Microengineering, vol. 16 (3): 473-479, Jan. 2006.

Prausnitz et al., "Microneedles for transdermal drug delivery", Advanced Drug Delivery Reviews, vol. 56 (5): 581-587, Mar. 2004.

Lhernould, "Optimizing hollow microneedles arrays aimed at transdermal drug delivery", Microsystem Technologies, vol. 19, 1-8, Jan. 2013.

Tyndall National Institute—Transdermal Drug Delivery—Microneedle Technologies for Transdermal Delivery (undated).

Non-Final Office Action i(NFOA) issued for U.S. Appl. No. 17/269,111, mailed Mar. 15, 2024 (22 pages).

International Search Report (ISR) for PCT/EP2018/075793 mailed Jun. 25, 2019 ( 5 pages).

Written Opinion for PCT/EP2018/075793 mailed Jun. 25, 2019 (8 pages).

International Search Report (ISR) for PCT/EP2018/075796 mailed Jun. 25, 2019 ( 4 pages).

Written Opinion for PCT/EP2018/075796 mailed Jun. 25, 2019 (6 pages).

International Search Report (ISR) for PCT/EP2018/075800 mailed Jun. 25, 2019 ( 4 pages).

Written Opinion for PCT/EP2018/075800 mailed Jun. 25, 2019 (7 pages).

Non-Final Office Action (NFOA) issued for U.S. Appl. No. 17/269,131, mailed Jun. 20, 2024 (15 pages).

Final Rejection issued for U.S. Appl. No. 17/269,131, mailed Oct. 1, 2024 (12 pages).

Non-Final Office Action (NFOA) issued for U.S. Appl. No. 17/269,131, mailed Feb. 12, 2025 (13 pages).

Office Action for U.S. Appl. No. 17/269,131 dated Jul. 29, 2025.

\* cited by examiner

DEVICE COMPRISING MICRONEEDLES FOR IN-SITU REACTION OF A SKIN

TECHNICAL FIELD

The present invention relates to a microneedle device comprising an array of microneedles which can be used to deliver a composition to skin, scalp, or lips to perform a cosmetic treatment, especially an anti-ageing and/or filling treatment.

BACKGROUND ART

It is known to use injectable cosmetic composition aimed at generating an in-situ aggregation into the skin, scalp, or lips, for example for diminishing facial lines, restoring volume and fullness in the face, or enhancing the appearance and elasticity of the skin. As we age, faces naturally lose subcutaneous fat. The facial muscles are then working closer to the skin surface, so smile lines and crow's feet for example become more apparent, and elasticity decreases. The facial skin stretches a bit, adding a loss of facial volume. Other factors that affect the facial skin include sun exposure, heredity and lifestyle.

The Stratum Corneum (SC) constitutes the main barrier of the epidermis to exogenous substances, including small and high weight molecular bio-polymers compositions. Techniques aimed at removing the SC barrier, such as tape-stripping and suction, laser, or thermal ablation are impractical, while needle-free injections have so far failed to replace known needle-based delivery. Such a method of delivery can be uncomfortable, and even painful, due to the shape of the needles, and the viscosity of the composition, such as compositions including hyaluronic acid, and are thus non-attractive for the users.

The concept of using a microstructured device consisting of a plurality of microneedles to breach the stratum corneum barrier was first proposed in the 1970s. The production of solid microneedles arrays has been described in the art, for example in the applications WO 2009/040548, US 2015/0141910, and WO 2016/076442. Microneedles have an advantage of potentially penetrating the stratum corneum, without the discomfort of known needles, and can be self-administered.

There is a need for improving the delivery of cosmetic compositions into the skin, scalp, or lips, especially the precision of the amount of delivered composition and the control of the depth of injection into the skin at the targeted location.

SUMMARY

An object of the present invention is a device comprising a base carrying a plurality of microneedles, characterized in that it includes at least one composition aimed at generating an in-situ reaction into the skin, scalp, or lips.

Using the device of the invention offers a long lasting solution for skin ageing signs and disorders correction, by improving skin penetration of such composition. The diffusion and reaction of the composition into the skin is eased by the use of microneedles, and its delivery is more comfortable that the known needle-based devices.

Microneedles improve skin penetration of bio-polymers, for example alginate solutions, of compositions and/or of active compounds solutions, as calcium carbonate solutions, to generate an in-situ aggregation or precipitation allowing a film/mesh formation. Compositions are delivered to the appropriated depth of the skin, that is to say to targeted skin layers.

Compositions are delivered deeper inside skin, by-passing and going through the SC layer.

Microneedles' lengths and dimensions are designed to target bio-polymers and divalent ions solutions delivery into skin layers, for example to:
a) enable diffusion of alginate solution which cannot reach deep layers with topical application and enable diffusion of divalent ions, as calcium carbonate solutions,
b) induce polymer gelation, such as alginate gelation, especially using an alginate and calcium reaction,
c) drive to long lasting and visible effects, especially tensile and firming effects, thanks to bio-polymers mechanism gel formation corresponding to an in-situ reticulation.

The device according to the invention allows targeting and delivering resorbable, injectable tensile, swelling or firming compositions aimed at generating an in-situ reaction into upper skin layers, in a homogenous way, to correct, supply volume, soften and/or erase skin ageing signs disorders, such as wrinkles, skin creases, especially facial creases, skin depressions, loss of elasticity, firmness, or hydration, modifications of the appearance of skin, modifications of the face oval, especially shallow contours, or the sagging of certain areas.

The delivery and diffusion of tensile, swelling or firming compositions is possible, even by reaching deep layers, which is not possible with topical applications. The invention facilitates the injection of bio-cosmetic compositions that aim at generating an in-situ reaction into the skin, scalp, or lips, especially for forming in-situ compositions of increased viscosity.

The device of the invention is convenient to use for cosmetic, non-therapeutic, treatments.

Microneedles

The microneedles used according to the invention are known in the art.

The microneedles may be hollow. By "hollow microneedles", it has to be understood that the microneedles are not solid.

Hollow microneedles are disclosed in many publications such as in the articles "*Microneedles for transdermal drug delivery*", Advanced Drug Delivery Reviews, Volume 56, Issue 5, 27 Mar. 2004, Pages 581-587, *"Biodegradable polymer microneedles: Fabrication, mechanics and transdermal drug delivery"*, Journal of Controlled Release, Volume 104, Issue 1, 5 May 2005, Pages 51-66, *"Microfabricated needles for transdermal delivery of macromolecules and nanoparticles: Fabrication methods and transport studies, transport studies"*, Devin V. McAllister et al., PNAS Nov. 25, 2003. 100 (24) 13755-13760, *"Sharp beveled tip hollow microneedle arrays fabricated by LIGA and 3D soft lithography with polyvinyl alcohol"*, F Pérennès et al., published 25 Jan. 2006, IOP Publishing LtdJournal of Micromechanics and Microengineering, Volume 16, Number 3, *"Microneedle array for transdermal biological fluid extraction and in situ analysis"*, E. V. Mukerjeeab et al., Sensors and Actuators A: Physical, Volume 114, Issues 2-3, 1 Sep. 2004, Pages 267-275, or *"Hollow Microneedle Arrays for Intradermal Drug Delivery and DNA Electroporation"*, Liévin Daugimont et al., The Journal of Membrane Biology, July 2010, Volume 236, Issue 1, pp 117-125.

Hollow microneedles are also known from internet publications, such as the ones at https://www.ncbi.nlm nih.gov/pmc/articles/PMC4588187/, concerning Transdermal Delivery of Drugs with Microneedles—Potential and Challenges, Pharmaceutics 2015 September; 7(3): 90-105, published online 2015 Jun. 29, or https://www.ncbi.nlm.nih.gov/pubmed/17940907, Pharmaceutics 2015 September; 7(3): 90-105, published online 2015 Jun. 29, concerning Membrane-sealed hollow microneedles and related administration schemes for transdermal drug delivery, or https://www.3m.com/3M/en_US/drug-delivery-systems-us/ . . . /microneedle/concerning 3M Microneedle Drug Delivery Systems, or https://link.springer.com/article/10.1007/s00542-012-1663-1 concerning Optimizing hollow microneedles arrays aimed at transdermal drug delivery, Microsystem Technologies, January 2013, Volume 19, Issue 1, pp 1-8, or https://www.tyndall.ie/transdermal-drug-delivery.

Hollow microneedles are also known from the patent application EP 2 876 602, describing a method for converting an image of an array of nanostructures to a representation in a coordinate system.

Patent application US 2011/0213335 discloses a rapid, high-volume, intradermal infusion with minimal pain, achieved by applying an array of several hollow microneedles into the skin of a patient.

Patent application US 2013/0116523 describes a method for fabricating a hollow microneedle having a variable appearance. The method makes it possible to vary the length of the microneedle, the outer and inner diameters of the upper and lower parts thereof, the aspect ratio, the sharpness, and the structural bending rate thereof, in accordance with the desired purposes of use.

Patent application U.S. Pat. No. 6,503,231 discloses a microneedle device for transport of therapeutic and diagnostic materials and/or energy across tissue barriers. The microneedles are hollow and/or porous and permit drug delivery, or removal or sensing of body fluids, at clinically relevant rates across skin or other tissue barriers, without damage, pain, or irritation to the tissue.

The hollow microneedles may have at least one internal channel. Such a channel may be longitudinal, that is to say running along a longitudinal axis of the microneedles, from their free ends to the base of the device, or transversal, that is to say running along an axis extending obliquely or perpendicularly to the longitudinal axis of the microneedles. The microneedles may have a plurality of channels, longitudinal and/or transversal. The channels running through the microneedles may be continuous or discontinuous.

The microneedles may have a circular hollow internal cross-section. In a variant, the microneedles have hollow internal cross-section of other shapes, for example square, rectangular, or triangular.

The microneedles may be made in a porous material, preferably able to be loaded with said at least one composition aimed at generating an in-situ reaction into the skin, scalp, or lips. The microneedles may be made in a sintered material.

In variants, the microneedles are solid. By "solid", it has to be understood that the microneedles are without an internal cavity, and are of uniformly close and coherent texture.

The microneedles are preferably resorbable.

By "resorbable microneedles", or "bioresorbable, or naturally-dissolving", it has to be understood that the microneedles dissolve or degrade in vivo, for example after between at least 10 seconds and 24 hours, preferably in less than 8 hours. The microneedles may be bioabsorbable or biodegradable. The microneedles may dissolve or degrade thanks to an enzymatic reaction. In the case of resorbable microneedles, the microneedles are advantageously manufactured from a material that may dissolve, be absorbed or broken down by the body and thus do not require any mechanical removal.

The microneedles may be soluble in any body fluid or suitable composition.

In a variant, resorbable microneedles may be swellable into the skin, scalp or lips, that is to say being able to increase in volume when injected into the skin, scalp or lips.

In the case of resorbable microneedles, at least part of the material in which are made the microneedles may be used, once injected into the skin, scalp or lips, as said at least one composition for generating the in-situ reaction.

In a variant where the microneedles are hollow and resorbable, at least part of the material in which are made the microneedles is preferably used, once injected into the skin, scalp or lips, to generate the in-situ reaction by reacting with a composition delivered by the hollow microneedles. In this variant, the microneedles may be swellable, being able to increase in volume by absorption of said composition.

In a variant, the microneedles are non-resorbable.

By "non-resorbable microneedles", it has to be understood that the microneedles do not dissolve or degrade in vivo, and that they have to be removed from the skin. The microneedles may be not moisture-swellable.

A length of each microneedle is preferably less than or equal to 50 mm, better to 20 mm, better to 5 mm, better to 1 mm, better to 0.3 mm, even better to 0.1 mm. The length of a microneedle is measured, along its elongation axis, from its free end to the point where it connects to the base. The expression "elongation axis of a microneedle" denotes an axis which passes through the centers of mass of the cross sections of the microneedle.

An external largest transverse dimension of each microneedle, measured at the point where it is attached to the base, perpendicularly to its elongation axis, may be less than or equal to 1500 micrometers, better to 1000 micrometers, even better to 300 micrometers. The external cross-dimension of the microneedles advantageously decreases regularly towards their free ends.

In the case of hollow microneedles, the internal volume of each microneedle may be less than 10 $mm^3$, better than 5 $mm^3$, even better than 3 $mm^3$.

Hollow microneedles may be configured to deliver a composition, especially a composition aimed at generating an in-situ reaction into the skin, scalp, or lips. Such microneedles may be configured to deliver the composition at a flow rate less than or equal to 3 $cm^3/min$, better to 0.3 $cm^3/min$.

Each microneedle may comprise a stop configured for limiting the depth of injection of the microneedle into the skin to less than or equal to 500 micrometers, better to 200 micrometers, even better to 100 micrometers.

An internal largest transverse dimension of each hollow microneedle, i.e. its diameter when the microneedle has a circular hollow cross-section, may be less than or equal to 1000 micrometers, better to 500 micrometers, even better to 200 micrometers. The internal largest transverse dimension of the microneedles may be chosen according to the required volume of composition to be distributed.

The microneedles are preferably longer than the desired depth of injection. The length of the microneedles may be chosen according to the targeted skin layer into which the microneedles have to be placed, and/or the composition has to be delivered, obtaining the appropriated depth into the skin.

The microneedles may be oriented perpendicular to a substantially planar surface along which the base extends. In a variant embodiment, the microneedles are oriented obliquely to the substantially planar surface along which the base extends. This allows delivering the composition to curved surfaces with locally oriented perpendicularly microneedles.

The microneedles may have a curved shape.

The microneedles may be of non-cylindrical shape, especially pyramidal with an octagonal base. The article of O'Mahony C., "Structural characterization and in-vivo reliability evaluation of silicon microneedles", Biomed Microdevices, 2014, 16(3):333-43 shows that conical shape leads to very high reliability for silicon microneedles during skin penetration. In variants, the microneedles may be of conical shape with other polygonal bases such as a hexagonal base, or of square shape.

The microneedles may be made of an inorganic material, preferably silicon, titanium, stainless steel, cobalt, ceramics, polyethylene, or any material than can be skin and/or body implantable. The material used for the microneedles may include a preservative, especially in the case of ceramics.

In a variant, the microneedles are made of an organic material, preferably a polymer, for example a Gantrez polymer, or sugar, polysaccharide, polyethylene, cellulose, or hyaluronic acid, or a carbonate solution.

The material used for the microneedles may be able to carry light and/or heat and/or cold.

The microneedles are preferably sterile or sterilized before use. The microneedles are preferably of single use.
Device, Control, Communication The base may be a flexible substrate, preferably coated with adhesive.

The device may comprise a plurality of rigid bases each carrying one or more microneedles, preferably integral therewith, and a flexible support to which the bases are fixed so that the bases can move relative to the other to conform to skin profile.

The device may be made of several bases connected together to one or different containers containing a composition to be injected.

The containers may be removed from the device and replace by a new one while the microneedles are still into the skin.

The containers may be refillable while still connected to an array of microneedles.

The base may carry between 2 and 1000 microneedles per cm', better between 15 and 50 microneedles. The number of microneedles by base advantageously depends on the targeted area of the skin to be treated. The number of microneedles on a base is advantageously related to the size of the base, which depends on the size of the area of the skin to be treated.

The device may be able to make the microneedles puncturing the skin at a deep level, then to distribute the composition while removing the device. This allows having a good distribution of the composition in the different skin layers.

The microneedles may be disposed regularly on the base. In a variant, the microneedles are non-regularly disposed on the base.

The base may carry only resorbable microneedles, or only non-resorbable microneedles. In a variant, the case carries a mix of resorbable and non-resorbable microneedles. The ratio of resorbable microneedles and non-resorbable microneedles may be between 0 and 1.

The base may carry only hollow microneedles, or only solid microneedles. In a variant, the case carries a mix of hollow and solid microneedles. The ratio of hollow microneedles and solid microneedles may be between 0 and 1.

The microneedles of a base may have different lengths, different volumes, different shapes, and may be made of different materials.

The device may be connected by wireless communication to an electronic system, in particular a personal computer or a smartphone, for injection control. In a variant, the device comprises an electronic system, especially a miniaturized system-on-chip.

Such electronic system may be arranged for computing for a set of injection points of said area, obtained from an optical acquisition of the topography of the area, a volume of composition to introduce into the skin to obtain a desired correction of the relief or appearance of this area, and computing a volume of composition to inject into the skin, scalp, or lips via each microneedle based on the volume computed in each point and localization of each microneedle on said area during the injection of composition. This allows obtaining great precision and avoiding errors, especially by preventing the risks of excess of composition and of overflow beyond the area to be filled.

The device may be able to deliver heat, cold, ultrasounds, massage, microcurrents, or light, to create a synergic effect on composition performance or to enable chemical reactions of the different compositions. Moreover, heat can be useful to maintain a low viscosity of the composition to ease its injection. Cold may help to harden the skin and to help skin being punctured by the microneedles. This delivering may be controlled by the electronic system.

The targeted area of skin may be sucked up into a chamber to bring the targeted area into contact with the microneedles. Sucking the skin helps the microneedles puncturing the skin, and also having the same penetration depth of all the microneedles into the skin.

To this end, it may be used a sucking device comprising:
a chamber with an opening configured to face the targeted area of the skin when the device is applied on the skin,
a surface within the chamber at a recessed position from the opening, and
a pressure source in communication with the chamber, at least for decreasing the pressure in the chamber and causing the targeted area to be sucked up in the chamber and to contact the surface,
the surface comprising the microneedles according to the invention for puncturing the skin of the targeted area.

An application, in particular running on a smartphone, may be used for delivery control and user interface.

The device may be part of a watch connected to a smartphone, or to a distant device connected with a wire or wireless, for example by radio frequency, WIFI, or
Bluetooth®.

A gas may be injected by the microneedles, before or after the delivery of the composition, preferably a carbon dioxide ($CO_2$). Such a gas injection is known to allow increasing blood flow into the skin, which permits to increase compounds exchanges between compositions and the skin and also to temporary create skin bumps beneficial for wrinkle size diminution. Carbon dioxide may be created while mixing a calcium carbonate solution ($CaCO3$) with an acid, as citric acid. Both components are compatible for injection into the skin. Other minerals and acids may be mixed to generate gas formation into the skin.

The device may comprise a vibrating system for inducing vibrations into the microneedles. Such a vibrating system may allow the microneedles to puncture the skin, avoiding fluid blockage in the microneedles, and then ease removing the non-resorbable microneedles from the skin after delivery of the composition. The vibrating system may further provide a massage to the treated area, allowing a better diffusion of the composition.

Compositions

The composition is preferably a biocompatible cosmetic composition. By "biocompatible", it has to be understood a composition capable of fulfilling a specific function with an appropriate response from the skin.

The composition is preferably sterile, and of single use.

The composition may comprise at least one bio-polymer, or solubilized active molecules, or semi soluble molecules or compounds able to react together.

The composition may be a fluid composition containing at least one material in the dispersed state in a liquid medium, said composition being solidifiable via the reaction of said material into the skin, scalp, or lips. In a variant, the composition is a fluid composition containing at least one material in the dispersed state in another composition containing others compounds, especially bacteria or enzymes.

By "reaction", it is meant a binding, cross-linking, reticulation, gelification, precipitation, aggregation, association, bounding, mixing, and more generally a transformation of the composition that causes its viscosity to increase between the moment the composition is prepared and some moment after injection, after it has reached its site of destination within the skin, scalp, or lips.

The increase of viscosity may take place under a gelification process or any other physical phenomenon causing particles or molecules of the material of the composition to agglomerate, or reticulate, for example under the effect of electrostatic forces or coalescence, which results in creating some kind of network or mesh.

The composition may also generate biological responses, such as collagen fibroblast production but also skin physico-chemical and mechanical modifications. The composition may generate a feeling of cold or of heat under the skin.

The result of the reaction may generate permanent or semi-permanent results, or reversible or not results. In case of reversible results, the pH of the composition may be modified several times to modify the level of gelification and/or to revert gelification to liquid.

The reaction is advantageously dedicated to generate an internal network or mesh, continuous or discontinuous, with a minimal thickness and/or volume. Such a network may have a biological and/or mechanical action inside the skin but also on top of skin.

Preferably, the reaction process is triggered by heat, when the temperature of the composition increases over a certain value, which is preferably chosen near to 37° C.

The composition may comprise at least one bio-polymer, preferably an alginate or hyaluronic acid, and an ion solution, in particular a divalent ion solution. The viscosity of the bio-polymer increases advantageously into the skin, by polymer gelation, to become solid or semi-solid. Thanks to bio-polymers reaction mechanism and the injection at high quantity and at the right depth into sites which cannot be reached using topical applications, long lasting and visible firming effects are obtained.

The composition may comprise at least one bio-polymer being able to be modified while in contact with another bio-polymer and/or an alcalin solution or acid solution.

The composition may comprise at least one compound able to crosslink in-situ, swell or become hard or semi-hard when being neutralized by a change of pH, or when adding a source of energy, such light. The composition may comprise at least one compound which is activable by any source of energy, being especially electroactivable and/or photoactivable.

A bio-polymer considered according to the invention may be the alginate Novabel® from Merz, resorbable in 3 to 6 months.

In a preferred embodiment, the composition comprises a sodium alginate and a calcium solution, preferably a $CaCO_3$ calcium carbonate solution. The efficient reactivity of alginates with calcium ions has been described in the article of B. Larsen et al "*Rheological characterization of an injectable alginate gel system*", BMC Biotechnology 2015, pages 15-29. Active compounds solution, such as calcium carbonate solution, allow, by transport of ion energy, generating an in-situ aggregation forming a film or mesh into skin layers.

Such a sodium alginate is derived from brown sea weeds, and may be a FMC® injectable polymer powder solubilized in water. Such a compound is a hydrophilic colloid, or hydrocolloid, defined as a colloid system in which the colloid particles are hydrophilic polymers dispersed in water.

The bio-polymer and the ion solution may be mixed before their injection in hollow microneedles. In a variant, the bio-polymer and the ion solution are stored in different containers and are separately injected in hollow microneedles, for example with a ratio of 50% each. The reaction of the composition is advantageously triggered by heat once injected into the skin.

In the case where the microneedles are hollow and resorbable, at least part of the material in which are made the microneedles may be used, once injected into the skin, scalp or lips, to generate the in-situ reaction by reacting with a composition delivered by the microneedles.

In a particular embodiment, the base comprises solid and resorbable microneedles made of different materials. These different materials are preferably two bio-polymers able to be modified while in contact with another, and to react together for generating the in-situ reaction when the microneedles are injected into the skin.

The reaction may be modulated at will, especially enhanced or delayed, by using at least one buffer and/or sequestrant.

Any kind of injectable bio-polymer acceptable for skin injection purposes may be used, as for example the ones allowed by the American Food and Drug Administration (FDA) or the French "Agence nationale de securite du medicament et des produits de santé" (ANSM).

The viscosity of the composition may range from $1 \cdot 10^{-3}$ Pa s$^{-1}$ to 10000 Pa s$^{-1}$, preferably from $1 \cdot 10^{-3}$ Pa s$^{-1}$ to 3000 Pa s$^{-1}$.

The viscosity is measured at 25° C. and under 1 atm, with a Rheomat 180 viscometer equipped with MK-R-1, 2 or 3 mobile according to the viscosity range and the corresponding measurement cup MB-R-1, 2 or 3 at a rotation speed of 200 min$^{-1}$, the measurement being carried out after 10 minutes of rotation (time at which the stabilization of the viscosity and the speed of rotation of the mobile is observed).

The cosmetic composition may be resorbable, that is to say may completely dissolve into the skin, in 3 to 6 months, or in 6 to 24 months, which corresponds to slowly resorbable. In a variant, the composition is definitive, non-resorbable.

On the long term, thanks to the invention, the own collagen production of the user may be stimulated thanks to the delivered composition, and long lasting effects can be observed.

Flexible System

The device according to the invention may be embedded on a flexible and wearable system arranged for conforming to the area of the skin where the composition has to be delivered.

Such a wearable system may be made of a non-woven, absorbent material such as for example foam, latex, polyurethane, or film. Such a wearable system may be made of a resorbable material.

The thickness of the wearable system may lie between 5 µm to 1 mm, preferably between 15 µm to 500 µm.

The wearable system may include a holding device to help its fixing on the treated area of the skin. The wearable system may include an adhesive polymer for fixing.

Kit

Another object of the invention is a kit comprising the microneedles device according to the invention and one or several compositions aimed at generating an in-situ reaction into the skin, scalp, or lips.

The compositions may be as defined above.

The features defined above for the device apply to the kit and vice-versa.

Method for Preparing an Injection

Another object of the invention is a method for preparing an injection of a composition aimed at generating an in-situ reaction into an area of skin, scalp, or lips for correcting a relief or appearance of this area, the injection being performed with the device as defined above, the method comprising:

performing an acquisition of the topography of the area, preferably an optical acquisition, and based on such acquisition of the topography, computing a volume of composition to inject into the skin, scalp, or lips via each microneedle.

The composition may be injected via hollow microneedles, and/or at least part of the material in which are made the microneedles is used as the composition. In the last case, "the injection of the composition" has to be understood as "the injection of the microneedles into the targeted area".

Such computing may take into account the localization of the microneedles on said area during the injection of composition, especially when the device allows for injection of different quantities of composition between at least two microneedles. For example, more composition is injected into the skin via some microneedles where the skin needs locally more composition to fill a hollow. The quantity of composition is thus adjusted very precisely depending on the local need for composition to achieve the desired correction.

The computing of the volume of composition to inject may also depend on the depth of injection and on the localization of the microneedles on the area to treat when successive injections are carried out with displacement of the device relative to the area to be treated from one injection to the other. For example, the device will inject a first quantity of composition when in a first position, then be removed and placed in a second position next to the first one, and then a second quantity of composition is injected, that is different from the first one, because for instance the need of composition locally is less. Accordingly, the device may compute a succession of volumes of composition to inject for respective injection sites. In such a case, each microneedle of the device may inject the same quantity of composition when injection takes place in one site, but this quantity varies when the device is positioned in another site.

The computing of the volume of composition to inject may further depend on the properties of reaction of the composition, in particular its viscosity and/or other physico-chemical characteristics after and before reaction.

The internal largest transverse dimension of the hollow microneedles may vary to enable different volume distribution in different sites, and also to help more viscous or less viscous composition to go through the microneedles. This allows a fine tuning of the composition delivery and helps to adjust ratios between all compositions to produce the desired reaction.

The position of the device on the skin, scalp, or lips may be automatically detected. The quantity of composition to be locally injected may be controlled as a function of the detected position and of the correction to be applied.

Thanks to the invention, the amount of delivered composition is finely adjusted.

The acquisition of the topography of the area may be performed by a 3D-scan or a profile-meter.

Methods to assess inskin modifications may be used, such as Optical Coherence Tomography (OCT), confocal microscopy, quantitative and qualitative assessment methods. OCT method may be used to monitor and locate injection sites into the skin, by using for example fluorescent molecules, radio tags, specific dosages. OCT method can be useful to follow gel formation inside the skin, scalp, or lips. Confocal microscopy can be useful to follow fluorescent molecules or polymers. The injected volume may be controlled thanks to a scale or a volume measurement device. An OCT portable device may be used.

It is also possible to follow the evolution of the injected solution in skin explants by freezing them after injection and performing a mechanical sagittal cut. Bioreactions can be assessed by biomarkers analysis.

In a particular embodiment, hollow microneedles are pre-filled with the composition before the application of the base on the skin. This allows avoiding the risk of injection of air.

In a variant, hollow microneedles are empty when the support is applied on the skin, and filled with the composition after the application on the skin, preferably continuously.

Method of Cosmetic Treatment

Another object of the invention is a method of cosmetic treatment for correcting a relief or appearance of an area of skin, comprising delivering into the area a composition aimed at generating an in-situ reaction into the skin, scalp, or lips and prepared by the method as defined above.

The depth of injection of the microneedles into the skin is preferably less than or equal to 500 micrometers, better to 200 micrometers, even better to 100 micrometers. This range of depths corresponds to the area above the dermo-epidermal junction, and avoids bleeding and thus offers a comfortable use of the device.

The depth of injection into the skin advantageously depends on the composition: lighter, finer compositions can be associated with superficial injection whilst heavier, coarser compositions are preferably injected deeper.

A pre-solution may be applied beforehand on the skin to increase solubility kinetics of the microneedles and allow their removal, if needed, after delivery of the composition, especially a solution compatible for injection into the skin and/or topical application, for example a saline solution. Such a pre-solution may help to prepare skin but also to ease skin perforation. Such a pre-solution may contain active compounds and or polymers dedicated for skin surface treatment and or diffusion.

As explained above, the injection may take place with different quantities of composition depending on the localization of the microneedles on the skin, scalp, or lips.

The features defined above for the device apply to the methods and vice-versa.

BRIEF DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
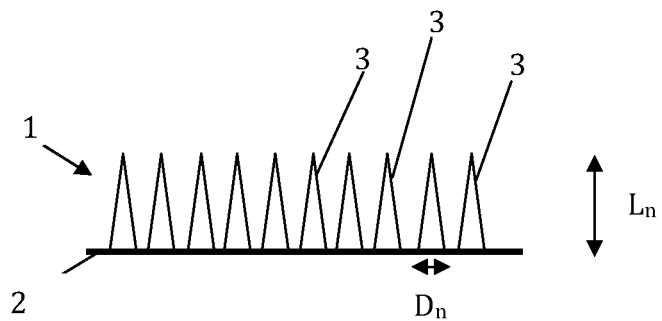
FIG. 1 shows a schematic embodiment of a microneedle device according to the invention.

A device 1 according to the invention for delivering a cosmetic composition aimed at generating an in-situ reaction into the skin, scalp, or lips is shown in FIG. 1. In this example, such a device 1 comprises a base 2 carrying a plurality of microneedles 3.

The microneedles may be resorbable or non-resorbable.

The base 2 is for example a flexible substrate.

The length $L_n$ of each microneedle 3 is less than or equal to 50 mm, being for example equal to 0.7 mm. The microneedle length is advantageously adjusted to target beyond the SC barrier and/or epidermis.

The external largest transverse dimension $D_n$ of a microneedle 3, visible in FIG. 1, is for example less than or equal to 1500 micrometers.

Preferably, the microneedles are of pyramidal shape with an octagonal base, and are oriented perpendicular to a substantially planar surface along which the base extends.

The microneedles are made of an inorganic material, for example silicon, or of an organic material, for example a polymer.

The device according to the invention may comprise a vibrating system, not shown, for inducing vibrations into the microneedles 3. These vibrations may at least allow removing non-resorbable microneedles from the skin after delivery of the composition. In a variant, a pre-solution is applied beforehand on the skin to weaken the microneedles 3 and allow their removal after delivery of the composition, especially a saline solution.

Preferably and as in the considered example, the composition comprises at least one bio-polymer and a divalent ion solution, in particular a sodium alginate and a $CaCO^3$ calcium carbonate solution. The bio-polymer considered according to the invention may be the alginate Novabel® from Merz, resorbable in 3 to 6 months.

As previously stated, the bio-polymer and the ion solution may be mixed before their injection in the microneedles 3. In a variant, the bio-polymer and the ion solution are separately injected in the microneedles 3, for example with a ratio of 50% each. The reaction of the composition is advantageously triggered by heat once injected into the skin.

In a variant embodiment, the composition comprises at least one bio-polymer being able to be modified while in contact with another bio-polymer and/or an alcalin solution or acid solution.

Figure 2:
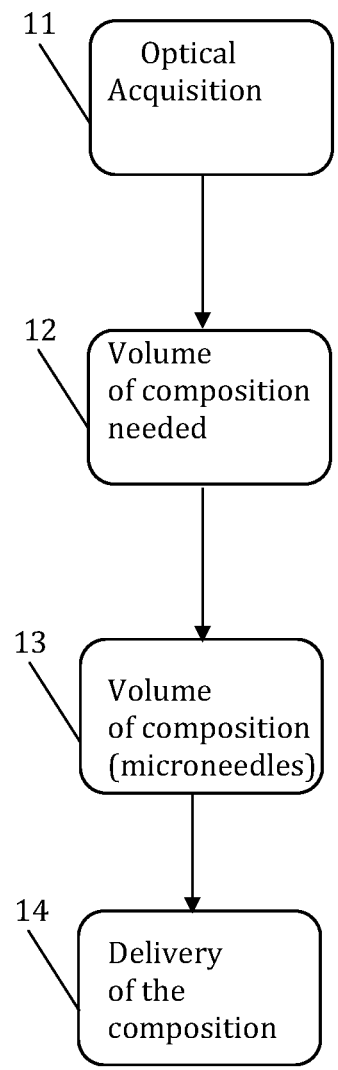
FIG. 2 is a block diagram illustrating some steps of a method for preparing an injection of a composition into an area of skin, scalp, or lips, according to the invention.

Some exemplary steps of a method, according to the invention, for preparing an injection of cosmetic composition aimed at generating an in-situ reaction into an area of skin, scalp, or lips for correcting a relief or appearance of this area, for example wrinkles, skin creases, skin depressions, loss of elasticity, modifications of the appearance of skin, or modifications of the face oval, using the microneedles device 1, are now going to be described, in reference with FIG. 2.

In a step 11, an optical acquisition of the topography of the area is performed, for example by using a 3D-scan.

For a set of injection points of said area, in a step 12, a volume of composition to introduce into the skin to obtain a desired correction of this area is computed. Such computation may use a model giving skin relief modification as a function of the quantity injected. The injected volume may be controlled thanks to a scale or a volume measurement device. The injected volume may be controlled thanks to a scale or a volume measurement device.

In a step 13, a volume of composition to inject into the skin, scalp, or lips via each microneedle 3 is computed, based on the volume computed in each point and on the localization of each microneedle on said area during the injection. This allows for example to take into account the distance between a point where a volume to be injected has been computed and the one or more microneedles closest to this point when the injection takes place.

It is also possible to compute the quantity of composition to inject in each point and to position exactly the microneedles in these points. The volume of composition to inject may further depend on the properties of reaction of the composition, for example its viscosity after and before reaction.

The composition is then delivered into the area for correction, in a step 14. In this example, the microneedles 3 are pre-filled with the composition before application of the base 2 on the area of the skin. The depth of injection of the microneedles 3 into the skin is preferably less than or equal to 500 micrometers. In another example, the microneedles are resorbable, and the material in which they are made is used, once injected into the skin, scalp or lips, as a composition for generating the in-situ reaction.

As previously defined, the device 1 may be connected by wireless communication to an electronic system, not shown, in particular a personal computer or a smartphone, for injection control, or comprises an electronic system. Such electronic system is in particular arranged for controlling the injection of a predefined quantity of composition into the microneedles 3, by performing at least some of the previously-described method steps. An application, in particular running on a smartphone, may be used for delivery control and user interface.

Example 1

In an example, a composition comprising a sodium alginate and a calcium solution is delivered, according to the invention and by using a microneedles device 1, into an area of the skin where a fold and both superficial and deep wrinkles have developed. The injection of the composition has been prepared as previously described: by computing a volume of composition to inject into the skin, scalp, or lips via each microneedle 3, based on a computed volume of composition to introduce in each point of the area and on the localization of each microneedle on said area during the injection of composition.

The container containing the composition to be injected may comprise several rooms; each room being able to contain a different composition. The different rooms may be connected together. The container may be a syringe with several needles. In this example, the first room is filled with a composition containing riboflavin and arginine, and the second room contains a composition of itaconic acid. After the injection of both compositions into the skin, the in situ reaction is obtained by photocuring, that is to say photoinduced hardening of the compositions, by using blue light projected onto the skin.

Thanks to bio-polymer gel formation mechanism, long-lasting, visible tensile, volumizing and firming effects can be observed: the fold and wrinkles are almost completely filled thanks to the invention.

Example 2

In another example, the microneedles 3 are hollow and resorbable, and at least part of the material in which are made the microneedles is used, once injected into the skin, to generate the in-situ reaction by reacting with a composition delivered by the microneedles. In this example, the material in which are made the microneedles 3 comprises a carbonate solution, and the composition delivered by the microneedles comprises an alginate.

Example 3

In yet another example, the base comprises solid and resorbable microneedles made of different materials: 50% of the microneedles are made of alginate, the other 50% being made of carbonate. These two bio-polymers are modified while in contact with another, and react together for generating the in-situ reaction when the microneedles are injected into the skin.

While illustrative embodiments have been illustrated and described, it will be appreciated that various changes can be made therein without departing from the spirit and scope of the claimed subject matter.

The invention claimed is:

1. A device comprising a base carrying a plurality of microneedles, wherein the device includes at least one composition that generates an in-situ reaction into the skin, scalp, or lips in order to correct, supply volume, soften and/or erase skin aging signs disorders, wherein:
   the in-situ reaction transforms the at least one composition by increasing viscosity of the least one composition by binding, cross-linking, reticulation, gelification, precipitation, aggregation, association, bounding, or mixing at a time between preparation of the at least one composition and up to post-injection into the skin, scalp, or lips.

2. The device of claim 1, wherein the microneedles are hollow.

3. The device of claim 1, wherein the microneedles are solid.

4. The device of claim 1, wherein the microneedles are resorbable.

5. The device of the claim 4, wherein the microneedles are swellable.

6. The device of claim 1, wherein the microneedles are non-resorbable.

7. The device of claim 1, wherein the microneedles are made in a porous material.

8. The device of claim 1, wherein a length of each microneedle is less than or equal to 50 mm.

9. The device of claim 1, wherein each hollow microneedle has an internal volume that is less than or equal to 10 $mm^3$.

10. The device of claim 1, wherein the microneedles are configured to deliver the composition at a flow rate less than or equal to 3 $cm^3$/min.

11. The device of claim 1, wherein each microneedle comprises a stop configured for limiting the depth of injection of the microneedle into the skin to less than or equal to 500 micrometers.

12. The device of claim 1, wherein an external largest transverse dimension of each microneedle is less than or equal to 1500 micrometers.

13. The device of claim 1, wherein the composition is a fluid composition containing at least one material in the dispersed state in a liquid medium, said composition being solidifiable via the reaction of said material into the skin, scalp, or lips.

14. The device of claim 1, wherein the composition comprises at least one bio-polymer, and an ion solution.

15. The device of claim 1, wherein the microneedles are hollow and resorbable, at least part of the material in which are made the microneedles being used, once injected into the skin, scalp or lips, to generate the in-situ reaction by reacting with a composition delivered by the microneedles, the composition delivered by the microneedles comprising an alginate.

16. A kit comprising a device such as defined in claim 1 and one or several compositions aimed at generating an in-situ reaction into the skin, scalp, or lips.

17. A method for preparing an injection of a composition aimed at generating an in-situ reaction into an area of skin, scalp, or lips for correcting a relief or appearance of this area, the injection being performed with the device as defined in claim 1, the method comprising:
   performing an acquisition of the topography of the area, and
   based on such acquisition of the topography, computing a volume of composition to inject into the skin, scalp, or lips via each microneedle.

18. The method of claim 17, wherein the computing of the volume of composition to inject further depends on the properties of reaction of the composition.

19. The method of claim 17, wherein the composition comprises at least one bio-polymer and an ion solution, the latter being mixed before their injection in hollow microneedles.

20. The method of claim 17, wherein the composition comprises at least one bio-polymer and an ion solution, the latter being stored in different containers and separately injected in hollow microneedles.

21. The device of claim 2, wherein the microneedles are resorbable.

22. The device of the claim 21, wherein the microneedles are swellable.

23. The device of the claim 15, wherein the material in which are made the microneedles comprises a carbonate solution.

24. The method of claim 20, wherein said at least one bio-polymer and ion solution are stored in different containers with a ratio of 50% each.

* * * * *